United States Patent
Datta et al.

(10) Patent No.: US 10,503,313 B2
(45) Date of Patent: Dec. 10, 2019

(54) UNIFIED INPUT/OUTPUT INTERFACE FOR ELECTRONIC DEVICE

(71) Applicant: Apple Inc., Cupertino, CA (US)

(72) Inventors: Supratik Datta, Sunnyvale, CA (US); Christiaan A. Ligtenberg, San Carlos, CA (US); Karan S. Jain, Cupertino, CA (US); Asif Hussain, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/107,479

(22) Filed: Aug. 21, 2018

(65) Prior Publication Data
US 2019/0056837 A1   Feb. 21, 2019

Related U.S. Application Data

(60) Provisional application No. 62/548,293, filed on Aug. 21, 2017.

(51) Int. Cl.
*G06F 3/041* (2006.01)
*G06F 3/044* (2006.01)
*G06F 3/01* (2006.01)
G06F 3/0354 (2013.01)

(52) U.S. Cl.
CPC .......... *G06F 3/0416* (2013.01); *G06F 3/016* (2013.01); *G06F 3/044* (2013.01); *G06F 3/0414* (2013.01); G06F 3/03547 (2013.01); G06F 2203/04106 (2013.01)

(58) Field of Classification Search
CPC . G06F 2203/04103; G06F 2203/04105; G06F 2203/04106; G06F 3/016; G06F 3/03547; G06F 3/0414; G06F 3/0416; G06F 3/044
See application file for complete search history.

(56) References Cited

U.S. PATENT DOCUMENTS

| | | | |
|---|---|---|---|
| 9,235,265 B2 | 1/2016 | Karamath et al. | |
| 2004/0178858 A1* | 9/2004 | Miyazaki | H03H 9/0547 331/158 |
| 2007/0080951 A1* | 4/2007 | Maruyama | G06F 1/1626 345/173 |
| 2015/0220197 A1* | 8/2015 | Algreatly | G06F 3/0414 345/173 |
| 2016/0370862 A1 | 12/2016 | Colgate et al. | |
| 2017/0060239 A1 | 3/2017 | Lim et al. | |
| 2018/0369866 A1* | 12/2018 | Sammoura | B06B 1/0622 |
| 2019/0042046 A1* | 2/2019 | Filiz | G06F 3/0414 |
| 2019/0050080 A1* | 2/2019 | Bagheri | G06F 3/0414 |

\* cited by examiner

*Primary Examiner* — Dmitriy Bolotin
(74) *Attorney, Agent, or Firm* — Brownstein Hyatt Farber Schreck, LLP

(57) ABSTRACT

Components associated with receiving user touch input, receiving user force input, and providing haptic output interface are integrated into a unified input/output interface that includes a transducer substrate formed with a monolithic or multi-layer body having a number of electrodes disposed on surfaces thereof. Electrodes are selected by a controller to provide touch input sensing, force input sensing, and haptic output.

20 Claims, 13 Drawing Sheets

UNIFIED INPUT/OUTPUT INTERFACE FOR ELECTRONIC DEVICE

CROSS-REFERENCE TO RELATED APPLICATION

This application is a non-provisional patent application of, and claims the benefit to, U.S. Provisional Patent Application No. 62/548,293, filed Aug. 21, 2017, and titled "Unified Input/Output Interface for Electronic Devices," the disclosure of which is hereby incorporated herein by reference in its entirety.

FIELD

Embodiments described herein relate to electronic devices, and in particular, to electronic devices that incorporate an interface to receive touch and force input from a user, and, additionally, to provide haptic output to that user.

BACKGROUND

An electronic device can include an input sensor to detect when a user touches a surface of the electronic device to provide a "touch input" to the electronic device. Such sensors, together with associated circuitry and structure, can be referred to as "touch input sensors."

Additionally, an electronic device can include an input sensor to detect when the user applies a purposeful force to a surface of the electronic device to provide a "force input" to the electronic device. Such sensors, together with associated circuitry and structure, can be referred to as "force input sensors."

An electronic device can also include a mechanical actuator to generate a mechanical output through a surface of the electronic device to provide a "haptic output" to the user. Such actuators, together with associated circuitry and structure, can be referred to as "haptic actuators."

In conventional configurations, however, touch input sensors, force input sensors, and haptic actuators are separately controlled and operated, and independently contribute to undesirable increases in thickness, weight, power consumption, and manufacturing complexity of an electronic device.

SUMMARY

Embodiments described herein generally reference an electronic device that includes a unified input/output interface. The unified input/output interface is implemented with a transducer substrate including a body formed from a dielectric material that induces an electrically-measurable response when compressed, such as a piezoelectric material. The transducer substrate also includes a set of electrodes disposed on a first surface of the body. A shared ground electrode is disposed onto a second surface of the body opposite the first surface. A haptic actuator, such as a stack actuator, is disposed below—and coupled to—the shared ground electrode.

In further embodiments, the unified input/output interface includes a controller configured to selectively activate the haptic actuator, and one or more electrodes of the set of electrodes in order to transition to, without limitation: a touch sensing mode; a force sensing mode; a haptic output mode; a touch and force sensing mode; a touch sensing and haptic output mode; a force sensing and haptic output mode; and so on.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
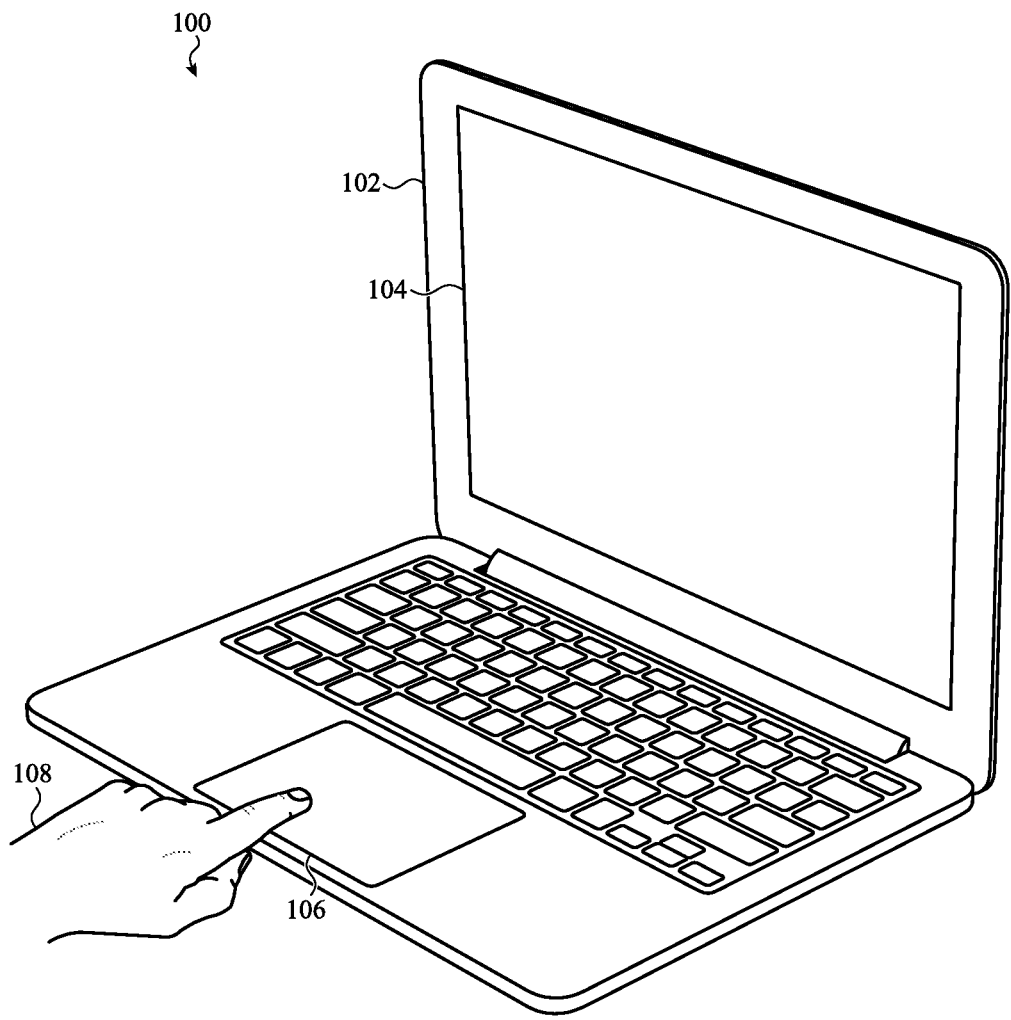
FIG. 1 depicts an electronic device incorporating a unified input/output interface, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference an electronic device that includes a unified input/output interface. The phrase "unified input/output interface," as used herein, generally references a system or set of components configured to (1) receive touch input and force input at a surface from a user and, additionally, (2) configured to provide haptic output to that same user through the same surface. The surface associated with a unified input/output interface, such as described herein, that may be touched by a user is referred to as an "interface surface."

In one example, a unified input/output interface is associated with an active display region of a display of an electronic device, such as a tablet computer or mobile phone. In this example, the interface surface is positioned above the active display region. The unified input/output interface can be positioned above, below, adjacent to, or along a perimeter of the display. In some cases, the unified input/output interface is integrated into the display. The interface surface associated with the unified input/output interface can be formed from an opaque or transparent material such as metal, glass, organic materials, synthetic materials, woven materials, and so on. In typical examples, the interface surface is a dielectric material, but this may not be required of all embodiments.

The unified input/output interface includes a monolithic or multi-layer substrate, referred to herein as a "transducer substrate." The transducer substrate is typically disposed below the interface surface and is positioned above, below, adjacent to, or along a perimeter of the active display region of the display. In some cases, an exterior surface of the transducer substrate defines the interface surface; a separate interface surface is not required. The unified input/output interface also includes two or more electrodes disposed onto surfaces of the transducer substrate. In one example, a transducer substrate receives a first array of electrodes on a top surface and a second array of electrodes on a bottom surface. The electrodes are electrically coupled to a controller of the unified input/output interface.

As a result of this construction, a user can touch the interface surface to instruct the electronic device to perform an action. The location(s) of the touch(es) can be detected by the unified input/output interface by operating one or more electrodes of the unified input/output interface as a capacitive sensor.

Alternatively or additionally, the user can exert a force onto the interface surface to instruct the electronic device to perform an action. The location(s) and/or magnitude(s) of the force input(s) can be detected by the unified input/output interface by operating one or more electrodes of the unified input/output interface as a compression or strain sensor.

Further, in response to receiving/detecting a touch input and/or a force input, the unified input/output interface can generate a haptic output through the interface surface at, or near, the location of the detected input to inform the user that the input was received, that an action was or will be performed, or for any other suitable notification or user experience purpose. In this operational mode, the unified input/output interface operates one or more electrodes as a drive electrode of a haptic actuator.

The preceding example embodiment is merely one example. For simplicity of description, many embodiments that follow reference a unified input/output interface operated in conjunction with a non-display region of an electronic device, such as a trackpad input region of a laptop computer. However, it is understood that a unified input/output interface, such as described below, can be suitably integrated into, or associated with, any surface of any electronic device, including but not limited to: display surfaces; non-display surfaces; housing surfaces; peripheral input device surfaces; front surfaces; back surfaces; sidewall surfaces; accessible interior surfaces; planar surfaces; curved surfaces; and so on.

A unified input/output interface, such as described herein, can be constructed in a number of ways. As noted above, a unified input/output interface includes a transducer substrate that can be operated to receive both touch input and force input and, additionally, can be operated to generate haptic output. A transducer substrate is typically implemented with a monolithic or multi-layered body formed into a planar sheet or layer from one or more materials that expand or contract in response to an electrical signal, such as piezoelectric materials, electroactive polymers, magnetostrictive materials, and so on. The body of the transducer substrate defines a top surface and a bottom surface (opposite the top surface) that are configured to receive one or more electrodes, or sets of electrodes.

In one example construction, a top electrode is disposed onto the top surface of the body of the transducer substrate and a bottom electrode is disposed onto the bottom surface of the body of the transducer substrate. In a "touch sensing mode," the unified input/output interface can be configured to operate the top electrode and/or the bottom electrode as a capacitive touch and/or presence sensor. In a "force sensing mode," the unified input/output interface can be configured to detect or otherwise measure a voltage between the top electrode and the bottom electrode that occurs as a result of compression (or relief from compression) of the body. In a "haptic output mode," the unified input/output interface can be configured to apply a voltage across the body, between the top electrode and the bottom electrode to cause the body to mechanically expand or contract.

In other embodiments, more than one electrode can be disposed onto the body of the transducer substrate in an array, grid, or pattern. For example, the top electrode referenced above can be segmented into a grid of individual electrodes. In another example, the top electrode referenced above can be segmented into a set of column electrodes and the bottom electrode referenced above can be segmented into a set of row electrodes, oriented perpendicular to the column electrodes. These are merely examples; it is appreciated that any number of patterns, orientations, and/or segmentations of one or more electrodes can be disposed onto a transducer substrate of a unified input/output interface, such as described herein.

In certain embodiments, the body of the substrate can be formed from multiple purpose-configured layers. For example, in one embodiment, a body may be formed with a force-sensing layer and a haptic output layer. The force-sensing layer can define the top surface that receives a first set of electrodes and the haptic output layer can define the bottom surface that receives a second set of electrodes. The force-sensing layer can be separated from the haptic output layer by a shared ground electrode layer. In some examples, the force-sensing layer and the haptic output layer can be formed from the same piezoelectric material to the same dimensions, but this is not required. In some cases, the force-sensing layer may be thinner than the haptic output layer. In some cases, the force-sensing layer can be formed from a first piezoelectric material and the haptic output layer can be formed from a second piezoelectric material. In other examples, other constructions and layer configurations are possible.

As noted above, a unified input/output interface, such as described herein, also includes—or is associated with—a controller electrically coupled to the transducer substrate via the one or more electrodes disposed on one or more surfaces of the body of the transducer substrate. The controller can include, or can be communicably coupled to, circuitry and/or logic components, such as a processor. The circuitry can perform or coordinate some or all of the operations of the controller including, but not limited to: providing a signal to generate a haptic output (herein, "haptic drive signals"); receiving a signal associated with a force input received from a user (herein, "force sense signals"); receiving a signal associated with a touch input received from a user (herein, "touch sense signals"); filtering sense signals based on one or more haptic drive signals; characterizing a haptic output—generated in response to a haptic drive signal—based on a touch or force sense signal; and so on.

The processor of the controller can be implemented as any electronic device(s) or component(s) capable of processing, receiving, or transmitting data or instructions in an analog and/or digital domain. For example, the processor can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor. Accordingly, as described herein, the term "processor" refers to a hardware-implemented data processing device or circuit physically structured to execute specific transformations of data including data operations represented as code and/or instructions included in a program that can be stored within and accessed from an integrated or separate memory. The term or phrase is meant to encompass a single processor or processing unit, multiple processors, multiple processing units, analog or digital circuits, or other suitably configured computing element or combination of elements.

As noted above, a transducer substrate, such as described herein, can be configured to operate in multiple modes, independently or simultaneously. More specifically, a transducer substrate can be operated in a "sense mode" in which one or more force inputs and/or touch inputs can be received and measured and a "drive mode" in which one or more haptic outputs can be generated. In certain embodiments, a transducer substrate can be operated in a "hybrid mode" in which one or more haptic outputs are provided while a force input and/or a touch input is received.

These and other embodiments are discussed below with reference to FIGS. 1-9. However, those skilled in the art will readily appreciate that the detailed description given herein with respect to these figures is for explanation only and should not be construed as limiting.

FIG. 1 shows an electronic device 100 that can include a unified input/output interface, such as described herein. As with other embodiments, the unified input/output interface can be configured to receive touch and/or force input from a user and to provide haptic output to that same user through the same surface. More particularly, the unified input/output interface is formed as a single substrate or component, from one or more layers. As a result of this construction, the unified input/output interface is substantially thinner than a conventional implementation that includes separate touch input sensors, force input sensors, and haptic actuators.

In the illustrated embodiment, the unified input/output interface is associated with an input area accommodated in an enclosure 102 of the electronic device 100. In the illustrated example, the unified input/output interface (described in greater detail below) is positioned in the conventional location of a trackpad area, subjacent to a keyboard disposed in a lower portion of a foldable enclosure of a laptop computer. In other examples, the unified input/output interface can be included in, or within, without limitation: a primary or secondary display region of the electronic device 100; a non-display region of the electronic device 100; a rear housing plate of the enclosure 102 of the electronic device 100; a biometric input region of the electronic device 100; keys of the keyboard of the electronic device 100; buttons of the electronic device 100; and so on.

Further, it may be appreciated that the depicted embodiment is merely one example and that other implementations of unified input/output interfaces can be integrated into, associated with, or take the form of different components or systems of other electronic devices including, but not limited to: desktop computers; tablet computers; cellular phones; wearable devices; peripheral devices; input devices; accessory devices; cover or case devices; industrial or residential control or automation devices; automotive or aeronautical control or automation devices; a home or building appliance; a craft or vehicle entertainment, control, and/or information system; a navigation device; and so on.

The enclosure 102 is configured to retain, support, and/or enclose various electrical, mechanical, and structural components of the electronic device 100, including, for example, a display 104 and a unified input/output interface 106. The enclosure 102 can be formed, as an example, from glass, sapphire, ceramic, metal, fabric, polymerized fiber, plastic, or any combinations thereof.

The electronic device 100 can also include a processor, memory, power supply and/or battery, network connections, sensors, input/output components, acoustic elements, haptic actuators, digital and/or analog circuits for performing and/or coordinating tasks of the electronic device 100, and so on. For simplicity of illustration, the electronic device 100 is depicted in FIG. 1 without many of these elements, each of which may be included, partially or entirely, within the enclosure 102 and may be operationally, structurally, or functionally associated with, or coupled to, the unified input/output interface 106.

As with many embodiments described herein, the unified input/output interface 106 is configured to detect touch input and force input and, additionally, is configured to operate in a touch sensing mode, a force sensing mode, a haptic output mode, and/or a hybrid mode in which haptic output is provided while force and/or touch input is received. In many cases, the touch input and force input can be provided to interact with content shown in a graphical user interface presented on the display 104, but it is appreciated that user input can be provided for other purposes as well.

The unified input/output interface 106 can be constructed in a number of ways, some of which are described in reference to FIGS. 2A-2D and 3A-3C. Independent of the particular construction or configuration selected for a particular embodiment of the unified input/output interface 106, it is appreciated that—as described above—the unified input/output interface 106 typically includes a single or multi-layer transducer substrate that defines (or is positioned below) an interface surface to receive touch and force input from the user 108. The transducer substrate typically includes a body formed from at least one layer of compressible material that produces an electrically-measurable response upon being compressed (e.g., change in resistance, change in capacitance, change in inductance, voltage production, charge production, and so on). The transducer substrate also includes at least one layer of electrodes disposed onto a surface of the compressible material of the body. By selectively coupling the electrodes of the transducer substrate to touch and/or force sensing circuitry (more simply, "sense circuitry"), touch input and force input can be detected. By selectively coupling the electrodes of the transducer substrate to haptic output circuitry (more simply, "drive circuitry"), haptic outputs can be provided. In this manner, the transducer substrate of the unified input/output interface 106 selectively operates the same physical structure and the same electrode pattern(s) for multiple, distinct input/output purposes.

More particularly, in a touch sensing mode, the unified input/output interface 106 of the electronic device 100 can be configured to determine a location of or one or more touches (e.g., single touch or multi-touch) to the interface surface by monitoring for changes in capacitance at one or more of the electrodes disposed on the surface of the body of the transducer substrate. The unified input/output interface 106 can operate according to any suitable capacitance or charge monitoring technique such as, but not limited to: mutual capacitive sensing; self-capacitive sensing; projected capacitance sensing; and so on. Additionally or alternatively, the unified input/output interface 106 can be configured to determine a touch gesture such as, but not limited to: a slide gesture; a rotate gesture; a pinch gesture; an expand gesture; multi-figure gestures; a swipe gesture; and so on.

In a force sensing mode, the unified input/output interface 106 can be configured to determine a location and/or a magnitude of one or more force inputs (e.g., single force or multi-force) to the interface surface by monitoring for changes in voltage between two or more of the electrodes disposed on the surface of the body of the transducer substrate. The unified input/output interface 106 can operate according to any suitable voltage monitoring technique. Additionally or alternatively, the unified input/output interface 106 can be configured to determine a force gesture such as, but not limited to: a hard press; a soft press; a force drag; a down-stroke threshold crossing; an up-stroke threshold crossing; and so on.

In a haptic output mode, the unified input/output interface 106 can be configured to apply a local, semi-local, or global haptic output through the interface surface by applying a voltage between two or more of the electrodes disposed on the surface of the body of the transducer substrate. In response to the voltage, the piezoelectric material of the body can compress or expand, inducing a bending moment into the interface surface and producing a haptic output. The haptic output can be any suitable haptic output such as, but not limited to: a tap or series of taps; a vibration; a static expansion; a static compression; and so on.

In a hybrid mode, the unified input/output interface 106 can be configured to apply a local, semi-local, or global haptic output through the interface surface by applying a voltage between two or more of the electrodes disposed on the surface of the body of the transducer substrate. Simultaneously, the unified input/output interface 106 is configured to detect and quantify touch and/or force input by measuring a capacitance or voltage associated with the same or different electrodes disposed on the surface of the body of the transducer substrate. In many examples, haptic output and input detection can be time-multiplexed whereas in other cases, the transducer substrate may include more than one layer that can be simultaneously operated, such as a haptic output layer and a force input layer.

Figure 2A:
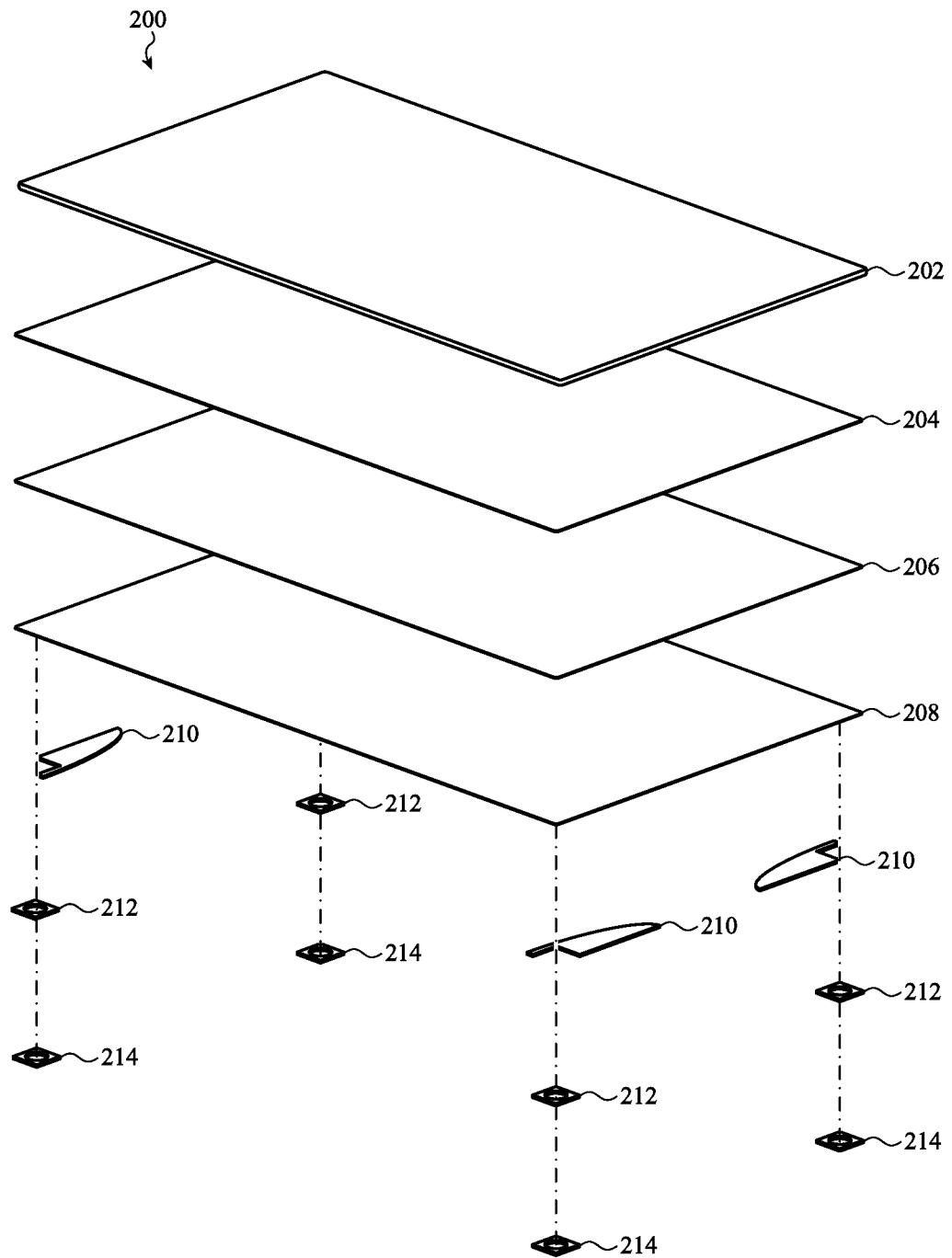
FIG. 2A depicts an assembly view of the unified input/output interface of FIG. 1.
Figure 2B:
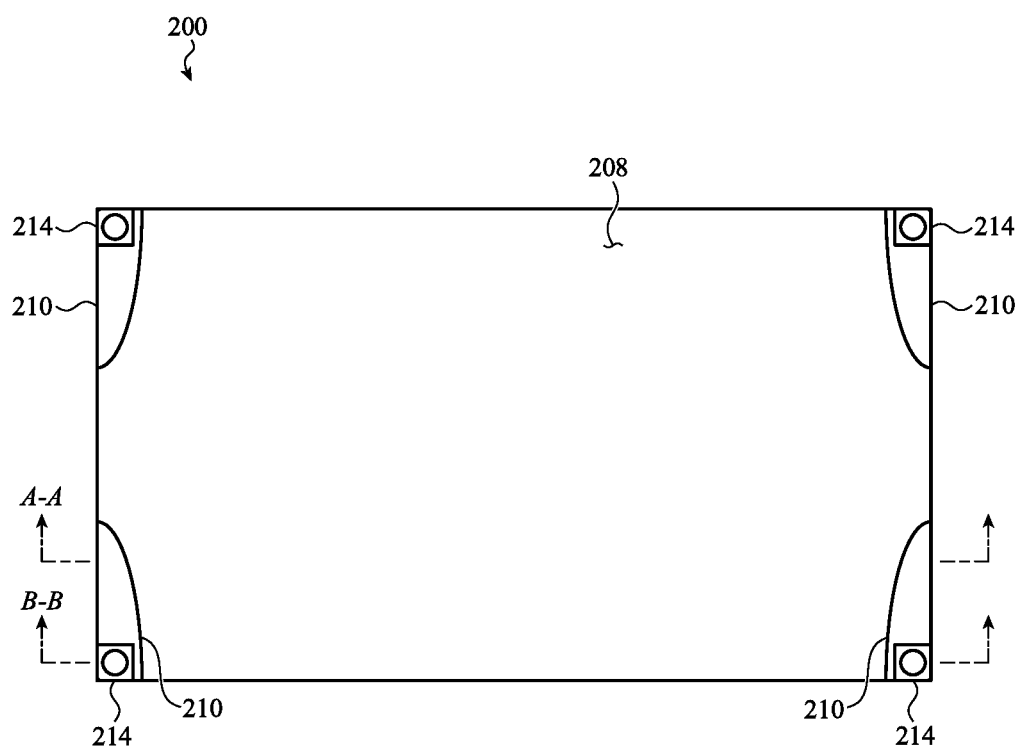
FIG. 2B depicts a bottom, assembled view of the unified input/output interface of FIG. 2A.

FIG. 2A depicts an assembly view of one example stack of layers that cooperate to define a unified input/output interface, such as the unified input/output interface 106 of FIG. 1. In this illustration, the interface is identified as the unified input/output interface 200.

In this embodiment, the unified input/output interface 200 is formed from multiple layers of material into a single unified stack. More particularly, in this example, the unified input/output interface 200 includes an outer cover layer 202 that is coupled, via an adhesive layer 204, to a routing insulator layer 206. A compression-sensitive layer 208 is positioned below the routing insulator layer 206. Four haptic stack actuators, each identified as a haptic stack actuator 210, are positioned below compression-sensitive layer 208 and aligned with corners of the compression-sensitive layer 208. The haptic stack actuators 210 are adhered to the compression-sensitive layer 208 via adhesives, identified as the adhesive regions 212, and/or via mechanical fasteners, such as the fastener/stiffeners identified in the figure as the stiffener 214. Assembled views and cross-sections of the unified input/output interface 200 are provided in FIGS. 2B-2D.

The outer cover layer 202 of the unified input/output interface 200 defines the interface surface that is touched by the user. The outer cover layer 202 can be formed from a number of materials including, but not limited to: glass, plastic, woven materials, synthetic materials, organic materials, and so on. In many cases, the outer cover layer 202 is substantially planar, but this is not required. The outer cover layer 202 can also include one or more aesthetic and/or cosmetic layers such as, but not limited to: ink layers; glyph layers; light guide regions; and so on.

As illustrated, the compression-sensitive layer 208 of the unified input/output interface 200 is positioned below the outer cover layer 202, separated by the adhesive layer 204 and the routing insulator layer 206, discussed in greater detail below. As a result of this construction, the outer cover layer 202 serves to protect and/or encapsulate subordinate layers of the unified input/output interface 200. In some embodiments, the outer cover layer 202 can be disposed to wrap around edges/sidewalls of the unified input/output interface 200 to provide further insulation, encapsulation, or protection to the unified input/output interface 200. In some examples, the outer cover layer 202 completely encapsulates the unified input/output interface 200.

Figure 2C:
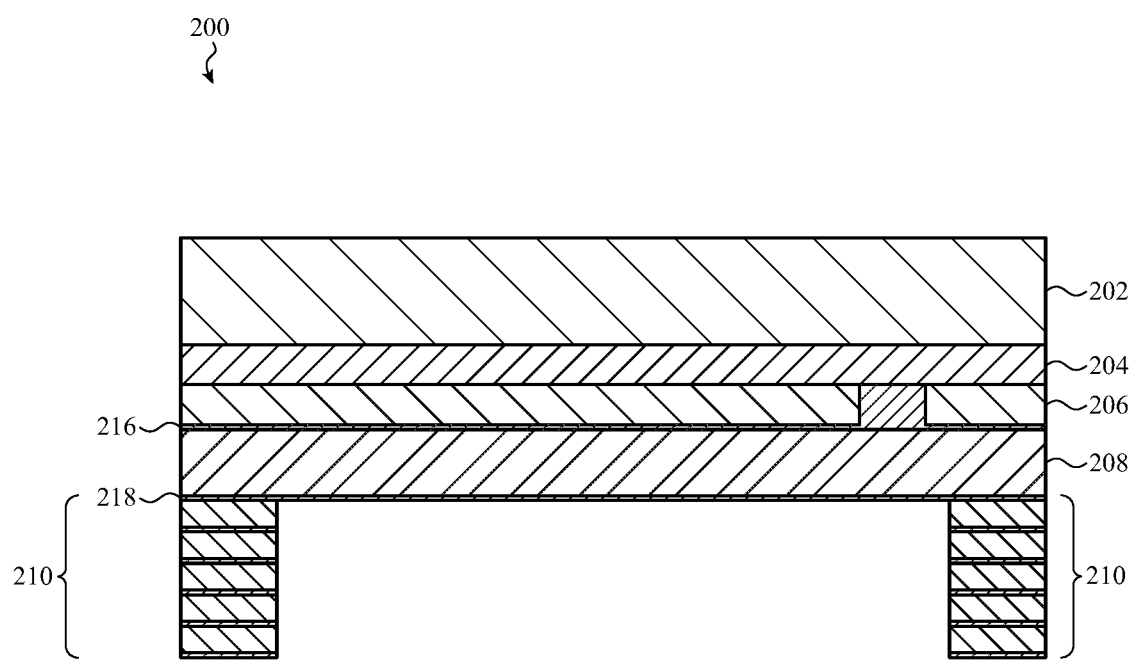
FIG. 2C depicts a cross-section of the unified input/output interface of FIG. 2B, taken through line A-A.
Figure 2D:
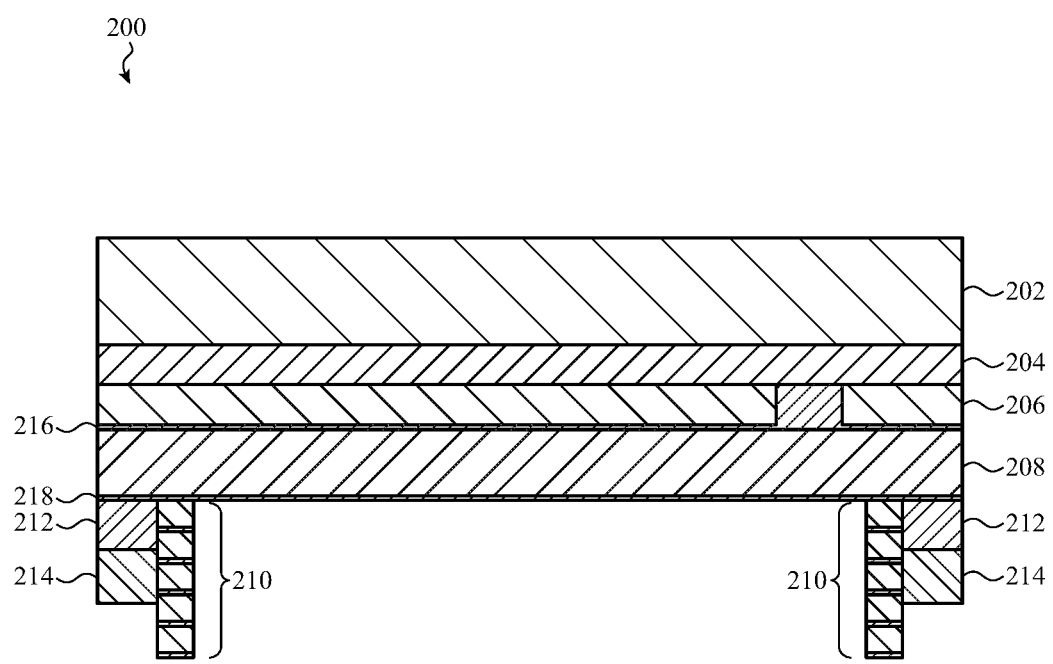
FIG. 2D depicts another cross-section of the unified input/output interface of FIG. 2B, taken through line B-B.

FIG. 2C depicts a cross-section of the unified input/output interface 200 taken through line A-A, in particular showing the compression-sensitive layer 208 and the haptic stack actuators 210. FIG. 2D depicts a cross-section of the unified input/output interface 200 taken through line B-B, in particular showing the adhesive regions 212 and the stiffeners 214.

In these examples, the compression-sensitive layer 208 includes a sense electrode array 216 and a ground electrode 218 that are separated by a body. As illustrated, the body is monolithic, but this may not be required; the body can be formed from multiple individual layers.

The sense electrode array 216 and the ground electrode 218 are formed from electrically conductive materials disposed onto the body of the compression-sensitive layer 208. In many cases, the sense electrode array 216 and the ground electrode 218 can be formed from the same material but this may not be required. Suitable materials for the electrodes include, but are not limited to: copper; gold; silver; titanium; and so on.

In one embodiment, the body is formed from a piezoelectric crystalline material that is configured to develop a measurable charge (between the sense electrode array 216 and the ground electrode 218) in response to compression or strain that results from a force applied to the outer cover layer 202. Suitable piezoelectric materials include, but may not be limited to lead-based piezoelectric alloys (e.g., lead zirconate titante) and non-leaded materials such as metal niobates or barium titanate. In other examples, single layer or multi-layer other piezoelectric compositions can be selected.

In other embodiments, the body of the compression-sensitive layer 208 is formed from another material such as, but not limited to: electroactive polymers; ferrofluid materials; magnetostrictive materials; piezoresitive materials; and so on. For simplicity of description, the body of the compression-sensitive layer 208 as described below may be considered to be formed from a piezoelectric material, but it is understood that this is merely one example. Similarly, the structural and/or functional configuration or implementation of the embodiments that follow may be appropriately modified based on the material(s) selected for the body of the compression-sensitive layer 208.

The sense electrode array 216 of the compression-sensitive layer 208 includes a number of individual sense electrodes (not visible in the simplified cross-sections shown) distributed across the compression-sensitive layer 208 in an array or pattern. Example electrode distributions and/or electrode patterns are shown and described in reference to FIGS. 5A-5C. Each individual sense electrode of the sense electrode array 216 is electrically coupled, via a trace formed on multiple surfaces of and/or through the routing insulator layer 206, to sensor circuitry such as touch sensor circuitry and/or force sensor circuitry to detect touch and/or force inputs to the outer cover layer 202.

In particular, in a touch sensing mode, the individual sense electrode of the sense electrode array 216 can be driven—via alternating current or direct current or any suitable waveform—to a particular voltage potential, biasing the electrode to a particular positive or negative charge. As a user's finger approaches one (or more) individual sense electrode of the sense electrode array 216, the charge of nearby electrodes will measurably change. Once a change or absolute value of charge (or voltage, phase, time-averaged amplitude, and so on) beyond threshold is detected, a touch event can be reported to a processor in communication with the unified input/output interface 200. The touch event can include touch position information, touch area information, touch gesture information, and so on. The touch event can be associated with one or more independent touch locations, gestures, or areas. The touch event can also include derivative information such as changes in area or location over time.

In other cases, other methods apart from self-capacitance can be used by the unified input/output interface 200 to detect one or more touches of a user such as, but not limited to: mutual capacitance between adjacent or vertically-aligned electrodes (e.g., in some embodiments the ground electrode 218 may be segmented); projected capacitance; and so on. Broadly, it is understood that the electrodes of the sense electrode array 216 can be used in any suitable manner to detect a user touch via capacitive sensing.

Similarly, in a force sensing mode, the individual sense electrode of the sense electrode array 216 can be monitored to determine whether voltage between the electrode and a reference voltage (e.g., ground) has changed. As a user's finger applies a compressive force to one or more individual sense electrode of the sense electrode array 216, the charge of the piezoelectric body nearby those electrodes may increase or otherwise change. Once a change or absolute value of charge (or voltage, phase, time-averaged amplitude, and so on) beyond threshold is detected, a force event can be reported to a processor in communication with the unified input/output interface 200. The force event can include force magnitude information, force directivity information, force position information, touch area information, force gesture information, and so on. The force event can be associated with one or more independent force locations, gestures, or areas. As with the touch sensing mode, the force can also include derivative information such as changes in force magnitude, direction, or location over time.

Similarly, in a hybrid sensing mode, a first subset of the individual sense electrode of the sense electrode array 216 can be selected to monitor for touch events whereas another subset of the individual sense electrodes of the sense electrode array 216 can be selected to monitor for force events. In this manner, both force and touch input events can be captured simultaneously. In another example, an electrode can be used to monitor for touch events during a first time period and used to monitor for force events during a second time period. It may be appreciated that any suitable time-multiplexing and/or selection algorithm or technique can be used to detect touch and force inputs substantially simultaneously.

As noted above, the unified input/output interface 200 is also configured to provide haptic output. The haptic stack actuators 210 of the unified input/output interface 200 can be actuated to provide haptic feedback to the user through the outer cover layer 202. In particular, each haptic stack actuator 210 in the illustrated example is formed from five layers of electrically-expandable and/or electrically-compressible material. In one specific example, each haptic stack actuator 210 is a piezoelectric stack actuator.

The layers of the haptic stack actuator 210 can be simultaneously or independently actuated or driven (e.g., via an application of voltage) to generate a mechanical output through the outer cover layer 202. In many embodiments, the haptic stack actuators 210 are electrically coupled to the ground electrode 218. As a result of this construction, the haptic stack actuators 210 are configured to share a common ground with the compression-sensitive layer 208, thereby reducing the manufacturing complexity and stack height of the unified input/output interface 200.

The material(s) selected for the various layers (if more than one is required) of the haptic stack actuators 210 can be any suitable material or combination of materials. For example, in one embodiment, each layer of each of the haptic stack actuators 210 is formed from a piezoelectric material. In other examples, the electrically-expandable and/or electrically-compressible material of each layer of each of the haptic stack actuators 210 is another material or structure such as, but not limited to: electroactive polymers; magnetostrictive materials; voice-coin structures; and so on.

In some cases, each layer of each of the haptic stack actuators 210 is formed to the same thickness and of the same material (or in the same structure), but this is not required; some layers may be thicker or shaped in a different manner than other layers. Further, in some cases, adjacent layers of each of the haptic stack actuators 210 can share electrodes, such as ground electrodes or drive electrodes. More particularly, in the illustrated embodiment, the electrodes (not labeled) separating each layer of each of the haptic stack actuators 210 can alternate between ground electrodes and drive electrodes. As a result of this construction, adjacent layers of the haptic stack actuators 210 are configured to share a common ground and/or a common drive electrode, thereby reducing the manufacturing complexity and stack height of the unified input/output interface 200.

In the illustrated embodiment, the haptic stack actuators 210 have a thickness that is approximately two-and-one-half times that of the compression-sensitive layer 208, but this may not be required. In one example, the haptic stack actuators 210 have a thickness of approximately 0.5 mm and the compression-sensitive layer 208 has a thickness of approximately 0.2 mm.

As illustrated, the haptic stack actuators 210 are disposed along the periphery of the unified input/output interface 200, but in some embodiments this may not be required. For example, in some constructions, the unified input/output interface 200 can include one or more haptic stack actuators in other locations and that take other shapes or thicknesses.

As illustrated, the haptic stack actuators 210 are illustrated as having a quartered elliptical shape. In one embodiment, the foci of the ellipse that defines the shape of the haptic stack actuators 210 are proportionately related to the dimensions of the unified input/output interface 200. For example, in one embodiment, the foci of an ellipse that defines the shape of the haptic stack actuators 210 is related to (e.g., proportional) the ratio of length to width of a rectangular or rectilinear unified input/output interface. For example, a square-shaped unified input/output interface may include haptic stack actuators having a quartered-circle shape whereas a unified input/output interface having a length much greater than a width may include haptic stack actuators defined by an ellipse having a more distant focal point than illustrated in FIGS. 2A-2B.

In still further examples, the haptic stack actuators 210 can take another shape such as, but not limited to: quartered or whole round shapes; rectilinear shapes; triangular shapes; quartered or whole polygonal shapes; quartered or whole arbitrary shapes; and so on.

It may be appreciated that the foregoing description of FIGS. 2A-2D, and various alternatives thereof and variations thereto are presented, generally, for purposes of explanation, and to facilitate a thorough understanding of various possible configurations of an interdigitated multimode transducer substrate of a unified input/output interface. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
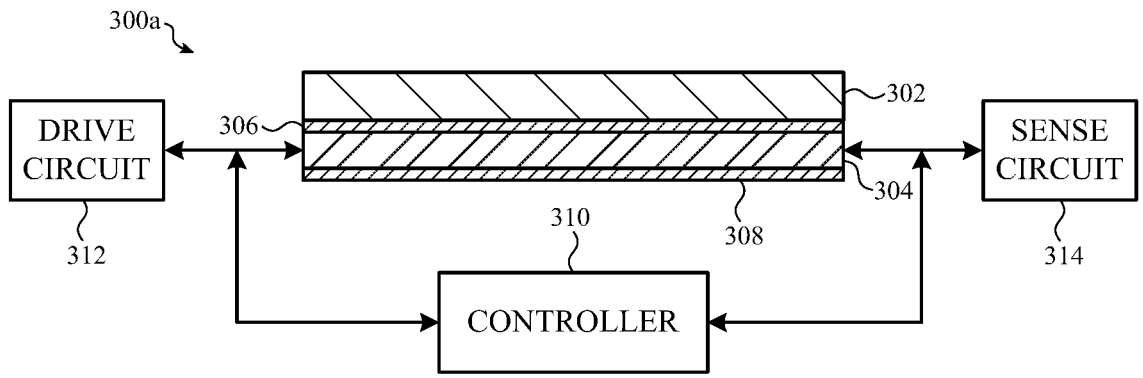
FIG. 3A depicts a simplified system diagram and cross-section of one example unified input/output interface, such as described herein.
Figure 3B:
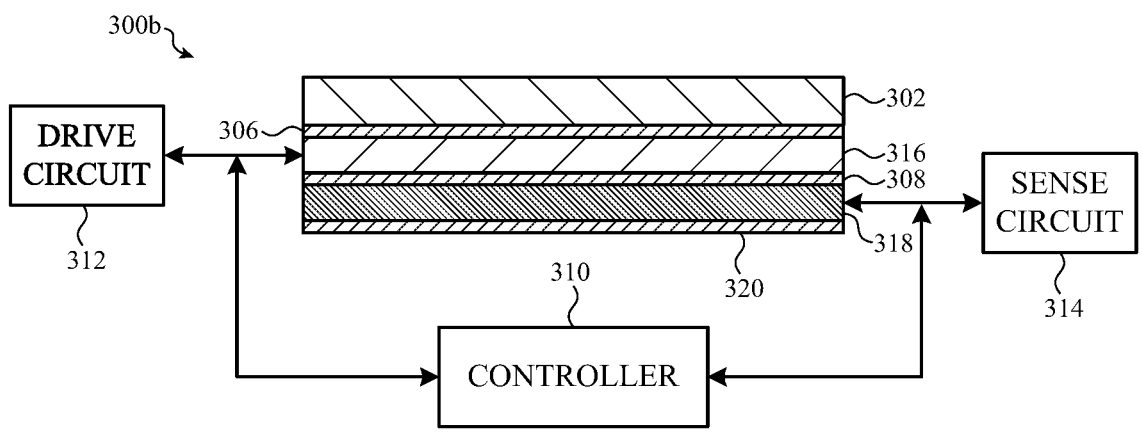
FIG. 3B depicts a simplified system diagram and cross-section of another example unified input/output interface, such as described herein.
Figure 3C:
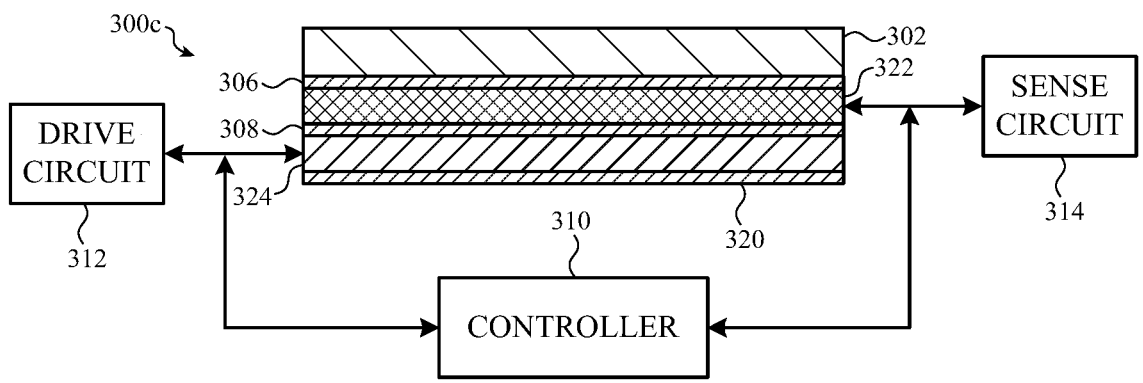
FIG. 3C depicts a simplified system diagram and cross-section of yet another example unified input/output interface, such as described herein.

Generally and broadly, FIGS. 3A-3C depict example configurations of a unified input/output interface. In these examples, a transducer substrate is depicted in cross-section. As noted with respect to other embodiments described herein, the unified input/output interfaces depicted and described with respect to these figures are each associated with at least one electrical circuit, generally referred to as a controller. The controller of these embodiments is understood to include both drive circuitry (configured to generate drive signals) and sense circuitry (configured to detect sense signals) in a single integrated circuit package, although in some cases, such circuitry may be functionally or physically separated.

In particular, FIG. 3A depicts a simplified system diagram of one example unified input/output interface, identified as the unified input/output interface 300a. In this example, the unified input/output interface 300a includes an outer cover layer 302 that defines an interface surface that may be touched by a user. The outer cover layer 302 is shown in cross-section.

The unified input/output interface 300a also includes a monolithic or multi-layer transducer substrate, identified as the transducer substrate 304, positioned below the outer cover layer 302. As with other embodiments described herein, the transducer substrate 304 can be formed from any number of suitable materials, including piezoelectric materials, electroactive polymers, magnetostrictive materials, and so on.

The transducer substrate 304 defines two surfaces, an upper surface and a lower surface. A first electrode 306 can be coupled to the upper surface and a second electrode 308 can be coupled to the lower surface. The first electrode 306 and the second electrode 308 can be planar, sheet electrodes disposed directly onto the upper and lower surfaces of the transducer substrate 304 using a suitable technique such as, but not limited to: physical vapor deposition; electroplating; electroless plating; and so on. As a result of this construction, the controller 310 can selectively electrically couple a drive circuit 312 to the transducer substrate 304 when the unified input/output interface 300a is operated in a drive mode or a hybrid mode. Similarly, the controller 310 can selectively electrically couple a sense circuit 314 to the transducer substrate 304 when the unified input/output interface 300a is operated in a sense mode or a hybrid mode.

In some examples, when operating in a drive mode, the controller 310 may be configured to disconnect and/or otherwise disable the sense circuit 314 to protect the sense circuit 314 from voltages generated by the drive circuit 312. Similarly, the drive circuit 312 can be disabled or disconnected when the sense circuit 314 is operating.

In this manner, by selectively activating the drive circuit 312, the sense circuit 314, and different portions of the transducer substrate 304, the unified input/output interface 300a can detect localized single or multi-force input, localized single or multi-touch input, and can provide localized or generalized haptic output.

For example, in some embodiments, the first electrode 306 and the second electrode 308 are both segmented into corresponding arrays of individual electrodes. The first electrode 306 can be subdivided into rows and the second electrode 308 can be subdivided into columns (see, e.g., FIG. 5A). As a result of this construction, overlapping regions between rows and columns can correspond to individual input sensor regions and/or individual haptic output regions; activating a single row and a single column can drive the transducer substrate 304 at a specific location and/or sense user input with transducer substrate 304 at a specific location.

Figure 5A:
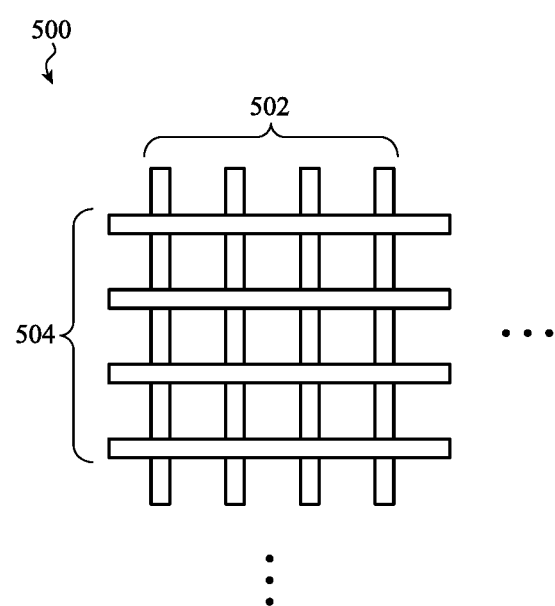
FIG. 5A depicts an example distribution of electrodes for a unified input/output interface, such as described herein.
Figure 5B:
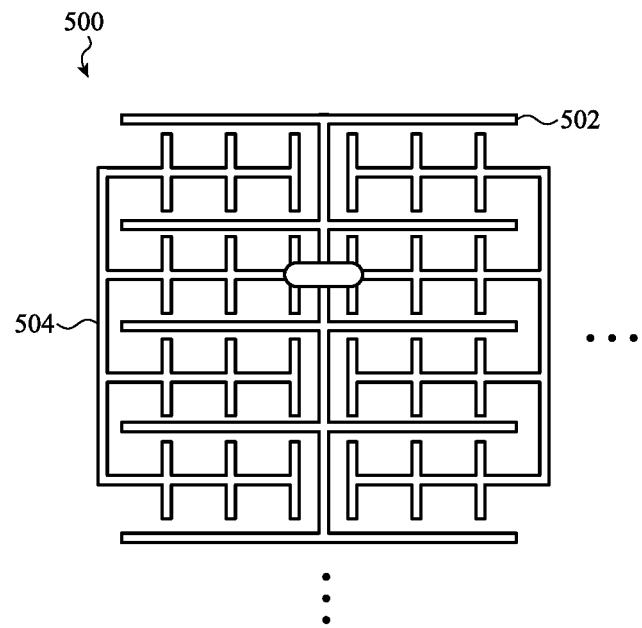
FIG. 5B depicts another example distribution of electrodes for a unified input/output interface, such as described herein.

In other examples, the first electrode 306 can be subdivided into a grid of individual electrodes and the second electrode 308 can be a single, planar, shielding electrode (see, e.g., FIG. 5B). As a result of this construction, adjacent electrodes on the upper surface of the transducer substrate 304 can be individual input sensors and/or individual haptic output regions; activating an electrode pair can drive the transducer substrate 304 at a specific location and/or sense the transducer substrate 304 at a specific location. In this example, the second electrode 308 can serve as a shield that, as one example, improves the sensing operations of the sense circuit 314.

In still further examples, the first electrode 306 can be subdivided into a grid of individual electrodes (see, e.g., FIG. 5C) and the second electrode 308 can be a single, planar, ground electrode. As a result of this construction, overlapping regions between the individual electrodes and the ground electrode can correspond to individual input sensors and/or individual haptic output regions; activating an individual electrode can drive the transducer substrate 304 at a specific location and/or sense the transducer substrate 304 at a specific location.

It is appreciated that the examples provided above are not exhaustive; other electrode patterns and subdivisions are possible. For example, in some cases, the first electrode 306—whether subdivided or otherwise—can be a ground electrode while the second electrode 308—whether subdivided or otherwise—can be a sense electrode. In some cases, the controller 310 can be configured to selectively operate different subdivisions of the first electrode 306 and the second electrode 308 as ground electrodes, sense electrodes, or drive electrodes. For example, in one embodiment, the controller 310 selects two electrodes that are opposite one another across the body of the transducer substrate 304. In one mode, a first electrode is operated as a drive electrode while a second electrode is operated as a ground electrode. In another mode, the first electrode is operated as a ground electrode while the second electrode is operated as a drive electrode. In another mode, the first electrode can be operated as a capacitive sense electrode while the second electrode is operated as a shield electrode. In another mode, the first electrode can be operated as a strain sense electrode while the second electrode is operated as a shield electrode. In another mode, the first electrode can be operated as a strain sense electrode while the second electrode is operated as a reference strain sense electrode. In another mode, the first electrode can be operated as a strain sense electrode while the second electrode is operated as a reference strain sense electrode. In another mode, the first electrode can be operated as a primary lead of a piezoelectric sensor while the second electrode is operated as a secondary lead of the piezoelectric sensor. In another mode, the first electrode can be operated as a primary plate of a gap-based capacitive compression sensor while the second electrode is operated as a reference plate of the sensor. In another mode, the first electrode can be operated with an adjacent electrode as a capacitive sensor while the second electrode is operated with an adjacent electrode as a drive electrode. It is appreciated that the examples provided above are not exhaustive; other configurations are possible.

FIG. 3B depicts a simplified system diagram of another example of a unified input/output interface, such as described herein. In this example, the unified input/output interface 300b is disposed below an outer cover layer 302 and is formed from multiple layers including a haptic actuator layer 316 and a sensing layer 318. In this example, the haptic actuator layer 316 and the sensing layer 318 are coplanar, but this is not required.

The haptic actuator layer 316 and the sensing layer 318 share a common electrode, identified as the second electrode 308. A third electrode 320 is coupled to a lower surface of the sensing layer 318. In this manner, the controller 310 can selectively couple the drive circuit 312 to the haptic actuator layer 316 and the sense circuit 314 to the sensing layer 318. As with other embodiments described herein, the three depicted electrode layers can each be subdivided and/or segmented to define discretely-controllable and addressable regions of the sensing layer 318 and the haptic actuator layer 316. In this manner, the controller 310 can be suitably configured to detect touch input (e.g., by measuring capacitive changes with and/or between the first electrode 306, the second electrode 308, and/or the third electrode 320), detect force input (e.g., by measuring charge or voltage changes between the second electrode 308 and the third electrode 320), and to provide haptic output (e.g., by applying a drive signal across the haptic actuator layer 316 between the first electrode 306 and the second electrode 308).

In still further examples, other configurations are possible. FIG. 3C depicts a simplified system diagram of another example unified input/output interface, such as described herein. In this example, the unified input/output interface 300c is disposed below an outer cover layer 302 and is formed from multiple layers including a dielectric sensing layer 322 and a force input/haptic output layer 324. In this example, the force input/haptic output layer 324 and the dielectric sensing layer 322 are coplanar, but this is not required.

The force input/haptic output layer 324 and the dielectric sensing layer 322 share a common electrode, identified as the second electrode 308. A third electrode 320 is coupled to a lower surface of the force input/haptic output layer 324. In this manner, the controller 310 can selectively couple the drive circuit 312 to the force input/haptic output layer 324 and the sense circuit 314 to electrodes defined on the dielectric sensing layer 322. As with other embodiments described herein, the three depicted electrode layers can each be subdivided and/or segmented to defined discretely-controllable and addressable regions (see, e.g., FIGS. 5A-5C) of the dielectric sensing layer 322 and the force input/haptic output layer 324. In this manner, the controller 310 can be suitably configured to detect touch input (e.g., by measuring capacitive changes with and/or between the first electrode 306 and/or the second electrode 308 across the dielectric sensing layer 322), detect force input (e.g., by measuring charge or voltage changes between the second electrode 308 and the third electrode 320), and to provide haptic output (e.g., by applying a drive signal across the force input/haptic output layer 324 between the second electrode 308 and the third electrode 320).

It may be appreciated that the foregoing description of FIGS. 2A-3C, and various alternatives thereof and variations thereto, are presented, generally, for purposes of explanation, and to facilitate a thorough understanding of various possible configurations of a transducer substrate of a unified input/output interface. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it is understood that one or more layers of a transducer substrate can be configured for multiple purposes. Similarly, different electrodes necessary to operate these layers in one or more modes can be shared by adjacent layers in the stack that defines the transducer substrate.

For example, some embodiments include a shared force input/touch input sensing layer disposed above a haptic output layer (see, e.g., FIGS. 2A-2D). Other embodiments include a shared layer operable to detect force input and touch input, and additionally operable to provide haptic output (see, e.g., FIG. 3A). Still further embodiments include a shared force input/touch input sensing layer disposed below a haptic output layer (see e.g., FIG. 3B). Still further embodiments include a shared force input/haptic output layer disposed below a touch sensing layer (see e.g., FIG. 3C). Other configurations are possible.

Figure 4:
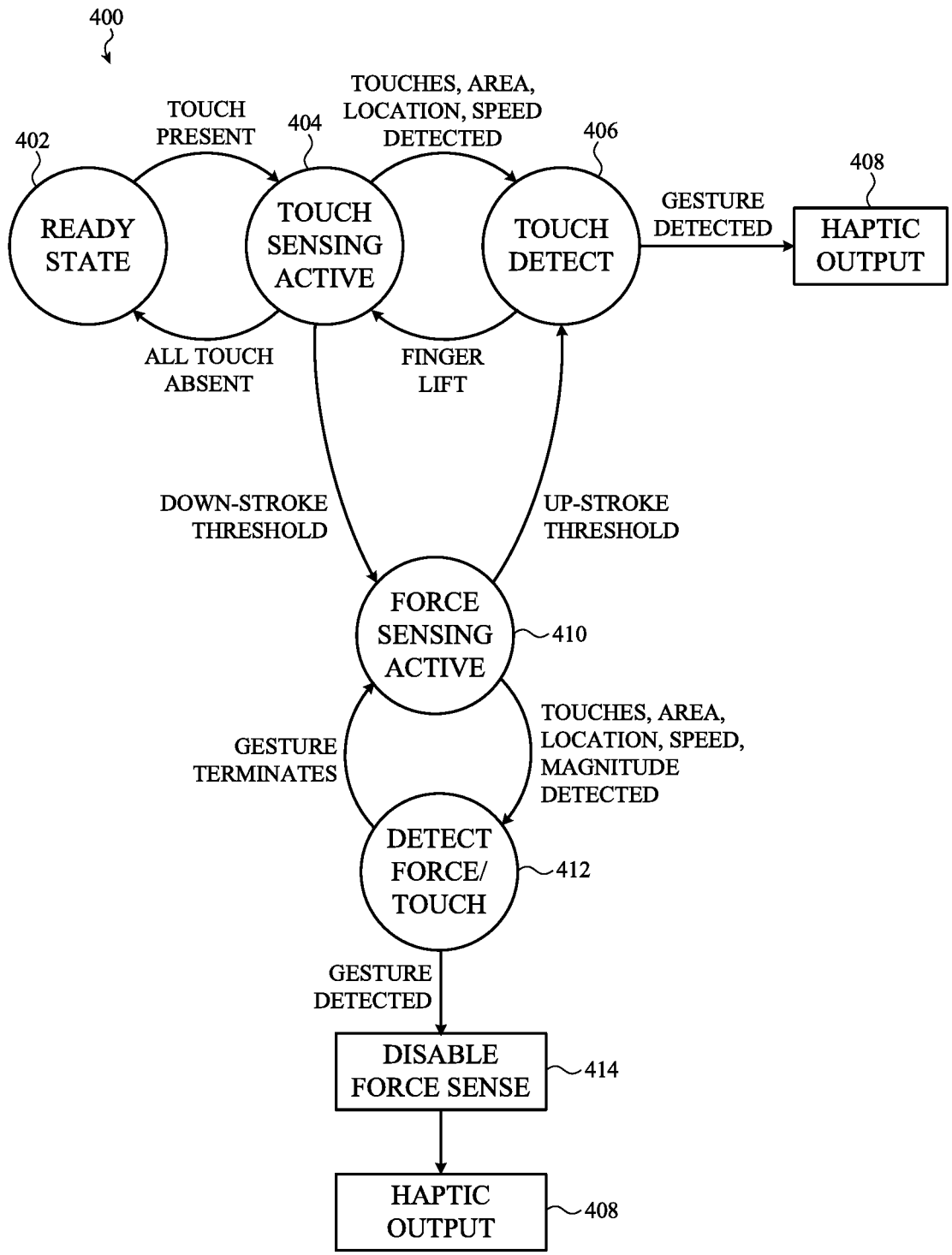
FIG. 4 depicts a finite state diagram corresponding to an operational configuration of a unified input/output interface, such as described herein.

Furthermore, it is understood that a controller of a unified input/output interface can be configured to transition between one or more modes (e.g., a touch sense mode, a force sense mode, a haptic output mode, a hybrid mode, and so on) in any number of ways. FIG. 4 depicts one example of a finite state diagram 400 corresponding to an operational configuration of a controller associated with a unified input/output interface, such as described herein.

The unified input/output interface depicted typically operates in a ready state 402 characterized by an absence of input provided to the interface surface. When in the ready state 402, the unified input/output interface operates one or more electrodes at a reduced duty cycle as a capacitive sensor in anticipation of a user touch. In some cases, the capacitive sensor can be formed by selecting: electrodes disposed on the same surface of a transducer substrate (coplanar mutual capacitive sensing); electrodes disposed on opposite sides of a transducer substrate (stacked mutual capacitive sensing); individual electrodes disposed on a surface of a transducer substrate (self-capacitive sensing); and so on. In typical examples, the ready state 402 is a lower-power state (e.g., low duty cycle) than other operational states of the unified input/output interface. As a result of this configuration, the unified input/output interface can be operated at lower average power.

When in the ready state 402, if a touch is detected on the interface surface (e.g., via capacitive sensing), the unified input/output interface transitions to a touch sensing state 404. When in the touch sensing state 404, similar to the ready state 402, the unified input/output interface operates one or more electrodes at an increased duty cycle as a capacitive sensor in anticipation of receiving a user force input and/or a user touch gesture. As a result of this configuration, the unified input/output interface can quickly detect small changes in user touch input. In some cases, as with the ready state 402, the capacitive sensor can be formed by selecting: electrodes disposed on the same surface of a transducer substrate (coplanar mutual capacitive sensing); electrodes disposed on opposite sides of a transducer substrate (stacked mutual capacitive sensing); individual electrodes disposed on a surface of a transducer substrate (self-capacitive sensing); and so on.

When in the touch sensing state 404, if a change in the touch input is detected (e.g., change in the number of touch locations, change in area of touch locations, change in location of touches, and so on), the unified input/output interface transitions to a touch gesture detection state 406 in anticipation of further changes to one or more characteristics of the touch input currently detected. When in the touch gesture detection state 406, the unified input/output interface is configured to detect touch gestures (while optionally ignoring or disregarding force input) including, but not limited to: swipe gestures; pinch gestures; expand gestures; slide gestures; press gestures with or without purposeful force; click gestures; and so on.

Once a gesture is detected and/or recognized, a haptic output can be provided by the unified input/output interface at stage 408 while the user's finger remains in contact with the interface surface. As with other embodiments described herein, the haptic output can be a localized or global haptic output. The haptic output can be any suitable haptic output such as, but not limited to: a click; a pop; a tap; a vibration; a protrusion; a shift; a translation; and so on.

While the haptic output is provided and the user's finger(s) remain in contact with the interface surface, the unified input/output interface can return to and/or remain in the touch gesture detection state 406. In this manner, if a subsequent change in the touch input is detected additional, different, or supplemental haptic feedback can be provided at stage 408.

However, when in the touch gesture detection state 406, if a user lifts one or more fingers (e.g., change in the number of touch locations), the unified input/output interface transitions back to the touch sensing state 404.

In some embodiments, when in the touch sensing state 404, the unified input/output system can disable force sensing circuitry and/or force sensitive portions of the transducer substrate in order to conserve power. For example, when in the touch sensing state 404, a force sensing circuit can be disabled, disconnected from ground, ground-shifted or biased, or operated at a reduced duty cycle. As a result of this configuration, the unified input/output interface can be operated at lower average power.

However, when in the touch sensing state 404 (and/or the touch gesture detection state 406), if a threshold-crossing change in the force applied to the interface surface input is detected (e.g., a down-stroke threshold is crossed), the unified input/output interface transitions to a force sensing state 410. When in the force sensing state 410, the unified input/output interface operates one or more electrodes at an increased duty cycle as a strain or compression sensor in anticipation of receiving a user force input and/or a user force gesture. In some cases, as with the ready state 402 and the touch sensing state 404, the strain sensor can be formed by selecting: electrodes disposed on the same surface of a transducer substrate (piezoelectric charge accumulation, strain or compression sensing, interdigitate capacitive gap strain sensing, and so on); electrodes disposed on opposite sides of a transducer substrate (piezoelectric charge accumulation, strain or compression sensing, vertical capacitive gap sensing, and so on); and so on.

When in the force sensing state 410, if a drop below a threshold in the magnitude of the force applied to the interface surface is detected, the unified input/output interface transitions back to the touch gesture detection state 406 as described above.

In the alternative, when in the force sensing state 410, if a change in the touch or force input is detected (e.g., change in the number of touch locations, change in area of touch locations, change in location of touches, magnitude of force applied, and so on), the unified input/output interface transitions to a touch and force gesture detection state 412 in anticipation of further changes to one or more characteristics of the touch input currently detected. When in the touch and force gesture detection state 412, the unified input/output interface is configured to detect touch gestures (including force information) including, but not limited to: deep press; light press; swipe gestures; pinch gestures; expand gestures; slide gestures; press gestures with or without purposeful force; click gestures; and so on.

Once a force and/or touch input gesture is detected and/or recognized, a haptic output can be provided by the unified input/output interface at stage 408 while the user's finger(s) remains in contact with the interface surface. In some cases, force sensing can be optionally disabled at stage 414 prior to providing haptic output. As with other embodiments described herein, the haptic output can be a localized or global haptic output. The haptic output can be any suitable haptic output such as, but not limited to: a click; a pop; a tap; a vibration; a protrusion; a shift; a translation; and so on.

While the haptic output is provided and the user's finger(s) remain in contact with the interface surface, the unified input/output interface can return to and/or remain in the touch and force gesture detection state 412. In this manner, if a subsequent change in the touch input is detected additional, different, or supplemental haptic feedback can be provided at stage 408.

However, when in the touch and force gesture detection state 412, if a user lifts one or more fingers (e.g., change in the number of touch locations), the unified input/output interface transitions back to the force sensing state 410.

It may be appreciated that the foregoing description of the state diagram in FIG. 4, and various alternatives thereof and variations thereto are presented, generally, for purposes of explanation, and to facilitate a thorough understanding of various possible operational modes or states of a controller of a unified input/output interface. However, it will be apparent to one skilled in the art that some of the specific details presented herein may not be required in order to practice a particular described embodiment, or an equivalent thereof.

Thus, the foregoing and following descriptions and specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, generally and broadly, it is understood that a controller of a unified input/output interface can be suitably configured to transition from and between, without limitation, a ready state, a touch-input detection state, a force-input detection state, a touch gesture recognition state, a force gesture recognition state, a touch and force gesture recognition state, a haptic output state, and so on.

Figure 5C:
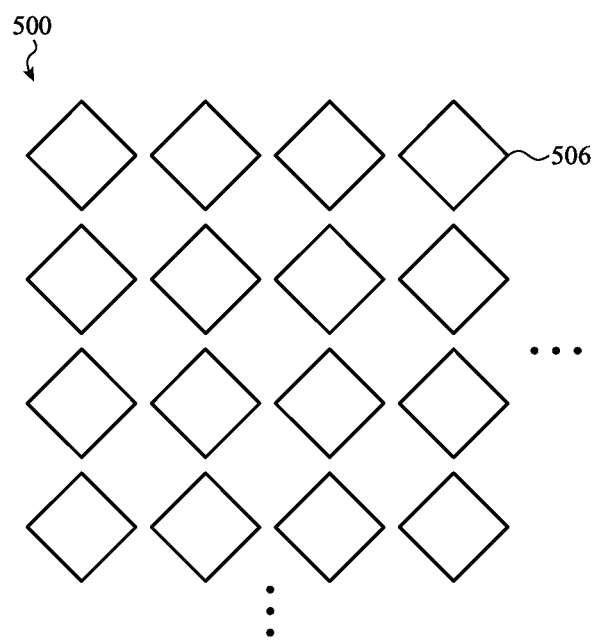
FIG. 5C depicts another example distribution of electrodes for a unified input/output interface, such as described herein.

Independent of a particular selected operational configuration for a controller of a unified input/output interface described herein, it is appreciated that the transition between one or more modes may depend, to some extent, on the layout and distribution of electrodes disposed on one or more layers of the transducer substrate. FIGS. 5A-5C depict various different example configurations and layouts of electrodes that can be disposed onto one or more surfaces of a transducer substrate such as described herein.

FIG. 5A depicts an example distribution of electrodes for a unified input/output interface. The electrode pattern 500 is typically disposed onto opposite faces of a planar body of a transducer substrate, such as a monolithic piezoelectric sheet. In this example, for simplicity of illustration, the depicted electrodes are shown without the transducer substrate.

In the illustrated embodiment, the electrode pattern 500 includes two sets of electrodes defining a grid. In particular, a set of column electrodes 502 is positioned perpendicular to a set of row electrodes 504. As a result of this construction, intersections between the set of column electrodes 502 and the set of row electrodes 504 define different, addressable, regions of the transducer substrate. For example, a controller can selectively activate one row and one column to define a capacitive sensor at the intersection of the row and column that can be used by the unified input/output interface for force sensing or touch sensing. In another mode, the controller can selectively activate two adjacent columns to define a mutual capacitive sensor that can be used by the unified input/output interface for touch sensing. In another mode, the controller can selectively activate a group of columns and a group of rows to define a haptic actuator at each intersection of each column and each row that can be used by the unified input/output interface to provide localized or semi-localized haptic output.

FIG. 5B depicts another example distribution of electrodes for a unified input/output interface, such as described herein. As with the embodiment depicted in FIG. 5A, the electrode pattern 500 is typically disposed on a planar body of a transducer substrate, such as a monolithic piezoelectric sheet. In this example, however, more than one electrode is disposed onto a single surface of the transducer substrate; a first electrode 502 is shown as interdigitally engaged with a second electrode 504. In this example, the first electrode 502 and the second electrode 504 can form a mutual capacitive sensor suitable for detecting touch input. In this example, the second electrode 504 extends across the first electrode 502 via a jumper (not labeled). The jumper may be defined through and/or disposed on a routing insulator layer, such as the routing insulator layer 206 depicted and described in reference to FIGS. 2A-2D.

FIG. 5C depicts another example distribution of electrodes for a unified input/output interface, such as described herein. As with the embodiment depicted in FIGS. 5A-5B, the electrode pattern 500 is typically disposed on a planar body of a transducer substrate, such as a monolithic piezoelectric sheet. In this example, as with the embodiment depicted in FIG. 5B, more than one electrode is disposed onto a single surface of the transducer substrate, one of which is identified as the simulated electrode 506.

It may be appreciated that the foregoing description of the state diagram in FIGS. 5A-5C, and various alternatives thereof and variations thereto, are presented, generally, for purposes of explanation, and to facilitate a thorough understanding of various possible electrode distributions associated with a transducer substrate of a unified input/output interface. However, it will be apparent to one skilled in the art that some of the specific details presented herein may not be required in order to practice a particular described embodiment, or an equivalent thereof. For example, in some cases, electrodes can be disposed onto one or more surfaces—including planar surfaces, sidewall surfaces, front surfaces, back surfaces and so on—of one or more transducer substrate layers.

Thus, the foregoing and following descriptions and specific embodiments are understood to be presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Independent of the particular electrode distribution(s) selected for a particular embodiment, it may be appreciated that a controller may be suitably configured to selectively activate and/or deactivate one or more electrodes (or portions of those electrodes) in order to transition between one or more mode or states such as, but not limited to: touch sensing states; force sensing states; touch and force sensing states; haptic output states; haptic output and force sensing states; haptic output and touch input states; and so on.

In some examples, as noted above, a controller of a unified input/output interface can be integrated into a single circuit package, such as an integrated circuit. An example integrated circuit system diagram is provided in FIG. 6.

In particular, the integrated circuit package 600 can include a power management controller 602 configured to receive, regulate, and/or distribute electrical power to other components within the integrated circuit package 600. The power management controller 602 can be configured to provide reset functionality, power sequencing control, brownout protection, overvoltage protection, and power management to the integrated circuit package 600. In some embodiments, the power management controller 602 can also include bandgap circuitry.

The integrated circuit package 600 can also include a touch sensing controller 604 that is configured to transmit signals to an electrode configured to operate as a portion of a touch sensor. The touch sensing controller 604 is coupled, and supplied, by a single inductor multiple output direct current converter 606. The single inductor multiple output direct current converter 606 also provides input voltage to a piezoelectric drive controller 608 that is configured to transmit haptic drive signals to an electrode configured to operate as a portion of a haptic actuator.

The integrated circuit package 600 can also include an oscillator 610 (that may include a phase lock loop or other synchronization circuitry), a direct memory access controller 612 (for storing instructions and/or outputs from one or more controllers of the integrated circuit package 600), and a waveform generator 614. The waveform generator 614 can be communicably coupled to one or both of the touch sensing controller 604 and/or the piezoelectric drive controller 608. In some cases, the waveform generator 614 includes a memory, such as a lookup table, to store one or more waveforms.

The integrated circuit package 600 can also include one or more sensors (labeled as the sensors 616), such as a temperature sensor. The integrated circuit package 600 can also include a general peripheral input/output controller 618 for communicating with other portions, modules, or components of an electronic device incorporating the integrated circuit package 600. In some cases, in addition to the general peripheral input/output controller 618, the integrated circuit package 600 includes a standardized controller for input and output, such as a universal serial bus controller. The auxiliary controller is identified as the input/output controller 620.

The integrated circuit package 600 can also include a sensing controller 622. The sensing controller 622 can be configured to receive sense signals associated with touch sensing and force sensing. The sensing controller 622 can be digital or analog and may include one or more digital to analog and/or analog to digital conversion stages. In some cases, the sensing controller 622 also includes one or more filtering stages configured to increase the signal to noise ratio of the sense signals received.

The integrated circuit package 600 can also include a general purpose processor 624, a general purpose memory 626, and (optionally) a general purpose serial port interface 628.

As noted above, the various systems and/or subsystems or modules of the integrated circuit package 600 can be suitably communicably coupled in any number of ways. For simplicity of illustration, a high performance bus 630 is shown; it is understood that the high performance bus 630 can suitably communicably couple any two or more of the above-referenced modules to any other component or module, internal or external to the integrated circuit package 600.

Figure 6:
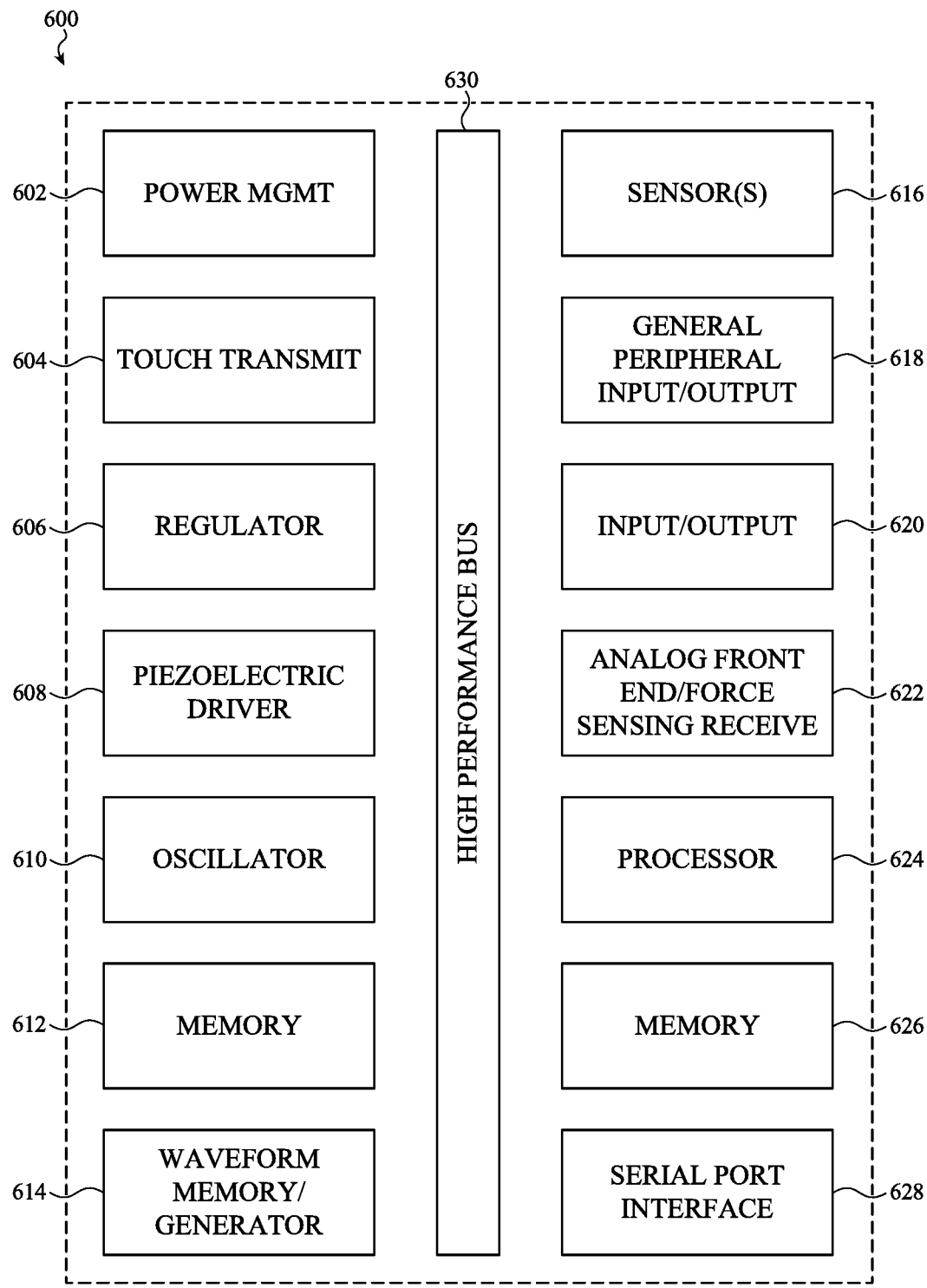
FIG. 6 depicts a system diagram of an integrated circuit that can be configured to control and/or operate a unified input/output interface, such as described herein.

As noted above, it may be appreciated that the foregoing description of the example system diagram presented in FIG. 6, and various alternatives thereof and variations thereto, are presented, generally, for purposes of explanation, and to facilitate a thorough understanding of various possible modules that can be included in an integrated circuit implementation of a controller of a unified input/output interface. However, it will be apparent to one skilled in the art that some of the specific details presented herein may not be required in order to practice a particular described embodiment, or an equivalent thereof. For example, in some cases, certain modules, components, controllers, and circuits mentioned above may be external to the controller.

Figure 7:
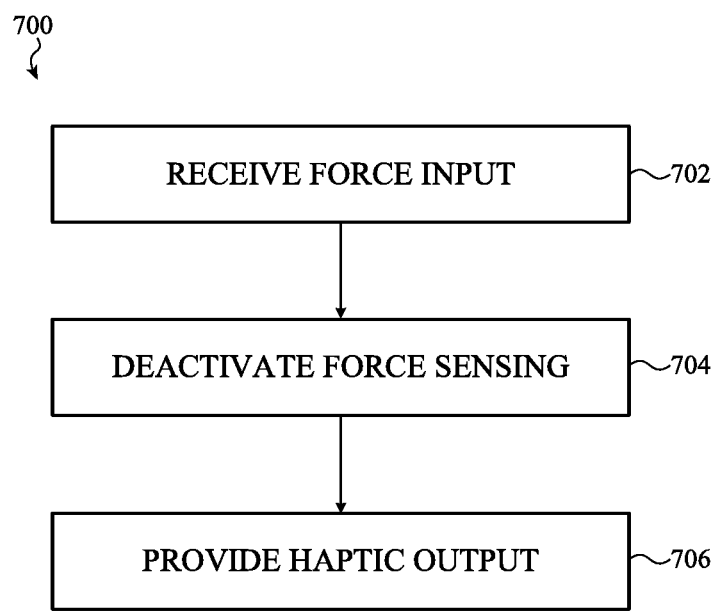
FIG. 7 depicts a flowchart including example operations of a method of receiving touch and force input with a unified input/output interface, such as described herein.
Figure 8:
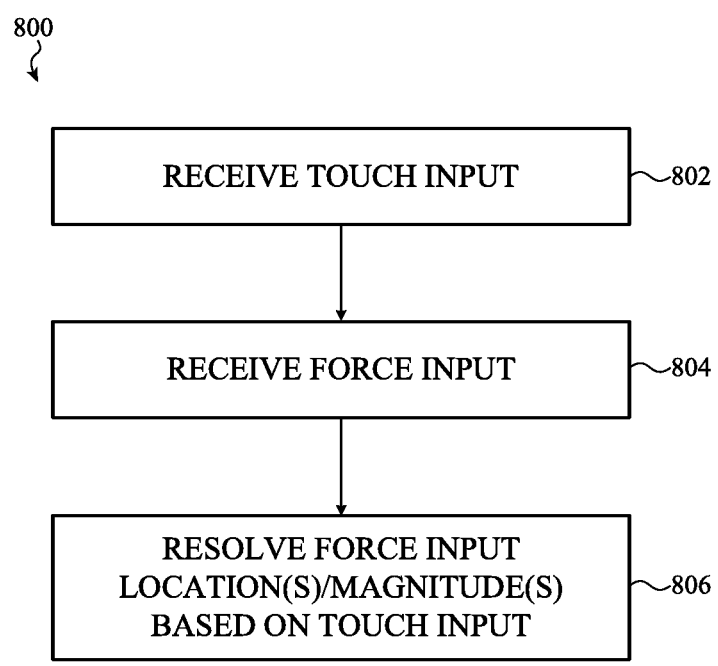
FIG. 8 depicts a flowchart including example operations of a method of providing haptic output with a unified input/output interface, such as described herein.

Further embodiments reference methods for operating a unified input/output interface. FIGS. 7-8 depict flowcharts including example operations of methods of receiving input and providing output with a unified input/output interface.

In particular, FIG. 7 depicts a flowchart including example operations of a method 700 of receiving touch and force input with a unified input/output interface, such as described herein. As with other embodiments described herein, the unified input/output interface can include a controller configured to perform, coordinate, monitor, and/or otherwise implement the method 700. The controller can be any suitable controller, processor, or combination of circuits such as described in reference to FIGS. 3A-3C, FIG. 4, and FIG. 6.

The method 700 includes operation 702 in which a force input is received. In many cases, the force input can be compared to one or more thresholds to determine whether the force input is an intentional and/or purposeful input. In other cases, the force input can be analyzed by a gesture detection controller (e.g., such as described above in reference to FIG. 4) to determine whether the input corresponds to a force gesture input. Next, at operation 704, force sensing circuitry can be disabled prior to providing haptic output at operation 706. In this manner, a unified input/output interface configured to receive force input and to provide haptic output can operate a single transducer substrate (e.g., having a body formed from a piezoelectric material) to receive both force input and to provide haptic output.

FIG. 8 depicts a flowchart including example operations of a method 800 of providing haptic output with a unified input/output interface, such as described herein. As with other embodiments described herein, the unified input/output interface can include a controller configured to perform, coordinate, monitor, and/or otherwise implement the method 800. The controller can be any suitable controller, processor, or combination of circuits such as described in reference to FIGS. 3A-3C, FIG. 4, and FIG. 6.

The method 800 includes operation 802 in which a touch input is received. in many cases, the touch input can be compared to one or more thresholds (e.g., speed thresholds, number of fingers providing input, direction thresholds, angular thresholds, rotation thresholds, and so on) to determine whether the touch input is an intentional and/or purposeful input. In other cases, the touch input can be analyzed by a gesture detection controller (e.g., such as described above in reference to FIG. 4) to determine whether the input corresponds to a touch gesture input.

Next, at operation 804, a force input is received. As with the embodiment described in reference to FIG. 7, the force input can be compared to one or more thresholds to determine whether the force input is an intentional and/or purposeful input. In other cases, the force input can be analyzed by a gesture detection controller (e.g., such as described above in reference to FIG. 4) to determine whether the input corresponds to a force gesture input.

Finally, at operation 806, the total force input can be divided among each individual touch location. In other words, the single force input vector can be resolved into individual vector components, each corresponding to a location and magnitude associated with a particular touch input received at operation 802.

In some embodiments, the operation of resolving a force vector into multiple components includes the operations of, in no particular order: determining a centroid of the received touch locations; determining a centroid of the received force based on output from one or more force sensors, or force sensor locations; comparing a centroid of the touch locations to a centroid of force locations; determining contact vectors associated with each touch location, initiated at the touch location centroid and/or the force location centroid; projecting a force vector (including the total force input as magnitude) onto one or more individual contact vectors; and so on. It is appreciated that a number of suitable techniques can be used to subdivide the force input to individual touch locations.

Further embodiments relate to techniques for selecting or determining one or more parameters of a haptic output that can be provided by a unified input/output interface such as described herein. For example, a haptic output provided by a unified input/output interface may be a vibration. For a consistent user experience, a unified input/output interface may require calibration to determine a particular vibration frequency (or set of vibration frequencies, that may include or omit harmonics) that displaces a transducer substrate of a unified input/output interface in a substantially constant manner across its area, based on vibratory modes of that particular transducer substrate. In other words, different transducer substrates may mechanically respond to vibrations of different frequencies, vibrating more in certain regions than in other regions. If improperly calibrated, a user touching a first area of the unified input/output interface may perceive a vibration of a different magnitude than at a second area, despite that the frequency of vibration is the same.

Figure 9:
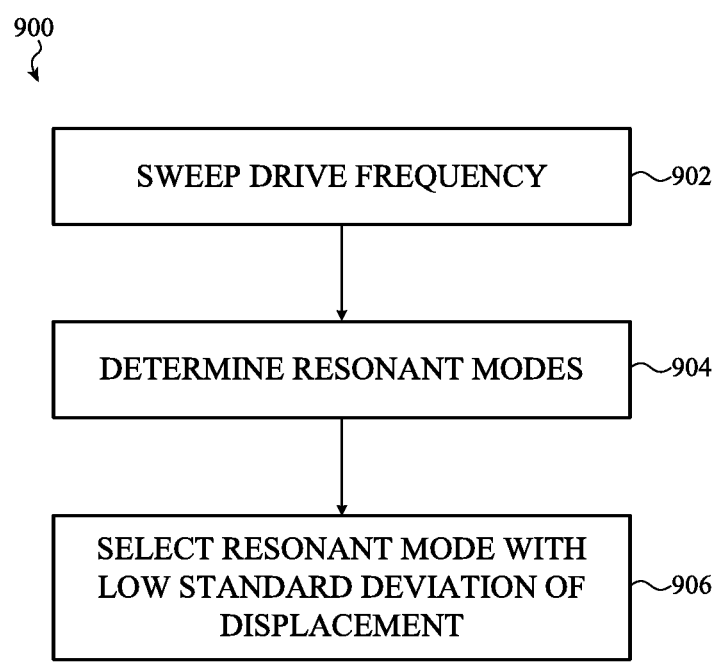
FIG. 9 depicts a flowchart including example operations of a method of calibrating the haptic output of a unified input/output interface, such as described herein.

FIG. 9 depicts a flowchart including example operations of a method 900 of calibrating (e.g., factory calibration, field calibration, and so on) haptic output of a unified input/output interface, such as described herein. As with other embodiments described herein, the unified input/output interface can include a controller configured to perform, coordinate, monitor, and/or otherwise implement the method 900. The controller can be any suitable controller, processor, or combination of circuits such as described in reference to FIGS. 3A-3C, FIG. 4, and FIG. 6.

The method 900 begins at operation 902 in which a transducer substrate of a unified input/output interface is operated in a haptic output mode. When in the haptic output mode, the transducer substrate is vibrated at a first drive frequency for a first time period and characteristics of the vibration are determined, namely, whether the first drive frequency produces a resonant mode in the transducer substrate. Next, a second drive frequency is selected (different from the first frequency) and characteristics of the vibration are determined. At operation 902, the drive frequency is swept from a low frequency to a high frequency to determine the resonant modes of the transducer substrate.

Next at operation 904, resonant modes are determined based on information obtained at operation 902. Once resonant modes are obtained, the resonant mode which corresponds to a low standard deviation of displacement across the surface is selected at operation 906. More specifically, the resonant mode frequency is selected such that variance in difference between a maxima and a minima in each local region of the transducer substrate is minimized.

As noted above, many embodiments described herein reference a unified input/output interface operated in conjunction with a non-display region of a portable electronic device. It may be appreciated, however, that this is merely one example; other configurations, implementations, and constructions are contemplated in view of the various principles and methods of operation—and reasonable alternatives thereto—described in reference to the embodiments described above.

For example, without limitation, a unified input/output interface can be additionally or alternatively associated with: a display surface, a housing or enclosure surface, a planar surface, a curved surface, an electrically conductive surface, an electrically insulating surface, a rigid surface, a flexible surface, a key cap surface, a trackpad surface, a display surface, and so on. The interface surface can be a front surface, a back surface, a sidewall surface, or any suitable surface of an electronic device or electronic device accessory. Typically, the interface surface of a unified input/output interface is an exterior surface of the associated portable electronic device but this may not be required.

Further, although many embodiments reference a unified input/output interface accommodated in a portable electronic device (such as a cell phone or tablet computer) it may be appreciated that a unified input/output interface can be incorporated into any suitable electronic device, system, or accessory including but not limited to: portable electronic devices (e.g., battery-powered, wirelessly-powered devices, tethered devices, and so on); stationary electronic devices; control devices (e.g., home automation devices, industrial automation devices, aeronautical or terrestrial vehicle control devices, and so on); personal computing devices (e.g., cellular devices, tablet devices, laptop devices, desktop devices, and so on); wearable devices (e.g., implanted devices, wrist-worn devices, eyeglass devices, and so on); accessory devices (e.g., protective covers such as keyboard covers for tablet computers, stylus input devices, charging devices, and so on); and so on.

One may appreciate that, although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A transducer substrate comprising:
a rectangular body formed from a piezoelectric material that induces an electrically-measurable response when compressed, the rectangular body defining a first surface and a second surface;
a set of electrodes disposed on the first surface;
a shared ground electrode disposed on the second surface; and
a piezoelectric stack actuator positioned below the rectangular body and coupled to the shared ground electrode.

2. The transducer substrate of claim 1, wherein the piezoelectric stack actuator is disposed at a corner of the rectangular body and is formed as a quartered ellipse.

3. The transducer substrate of claim 2, wherein a focus of the quartered ellipse is proportionately related to a ratio between a width and a height of the rectangular body.

4. The transducer substrate of claim 1, wherein:
the piezoelectric material is a first piezoelectric material; and
the piezoelectric stack actuator comprises a second piezoelectric material different from the first piezoelectric material.

5. The transducer substrate of claim 1, further comprising an outer cover layer disposed over the rectangular body.

6. The transducer substrate of claim 5, wherein the outer cover layer is formed from glass.

7. The transducer substrate of claim 1, wherein the set of electrodes comprises an array of electrodes disposed as capacitive sensors configured to detect a user touch.

8. The transducer substrate of claim 1, wherein:
the piezoelectric stack actuator is a first piezoelectric stack actuator disposed at a first corner of the rectangular body; and
the transducer substrate further comprises:
a second piezoelectric stack actuator disposed at a second corner of the rectangular body;
a third piezoelectric stack actuator disposed at a third corner of the rectangular body; and
a fourth piezoelectric stack actuator disposed at a fourth corner of the rectangular body.

9. The transducer substrate of claim 1, wherein the piezoelectric stack actuator comprises greater than three layers of piezoelectric material, each separated by a respective electrode layer.

10. An electronic device comprising:
a rectangular interface surface for receiving touch input and force input from a user;
a transducer substrate below the rectangular interface surface and comprising:
a touch and force input layer;
a haptic output layer comprising at least two piezoelectric stack actuators positioned below and coupled to each of at least two respective corners of the touch and force input layer; and
a shared electrode positioned between the touch and force input layer and the haptic output layer; and
a controller coupled to the transducer substrate and configured to operate the transducer substrate in a force sensing mode, a touch sensing mode, and a haptic output mode; wherein:
each of the at least two piezoelectric stack actuators comprises at least three piezoelectric layers separated by at least two electrode layers.

11. The electronic device of claim 10, wherein the touch and force input layer comprises:
a piezoelectric body; and
an array of electrodes disposed onto a surface of the piezoelectric body opposite the shared electrode.

12. The electronic device of claim 11, wherein, in the force sensing mode, the controller is configured to select an electrode from the array of electrodes and to measure a voltage between the selected electrode and the shared electrode.

13. The electronic device of claim 11, wherein, in the touch sensing mode, the controller is configured to select a first electrode and a second electrode from the array of electrodes and to measure a capacitance between the first electrode and the second electrode.

14. The electronic device of claim 11, wherein, in the haptic output mode, the controller is configured to apply a voltage to the haptic output layer.

15. The electronic device of claim 10, wherein the shared electrode is a ground electrode.

16. The electronic device of claim 10, wherein the electronic device is a trackpad input device.

17. A transducer substrate comprising:
a monolithic body formed from a first piezoelectric material and defining a top surface and a bottom surface;
a first electrode set coupled to the top surface;
a second electrode set coupled to the bottom surface;
a piezoelectric stack actuator comprising at least two layers of a second piezoelectric material, the piezoelectric stack actuator disposed relative to an edge of the monolithic body and electrically coupled to at least one electrode of the second electrode set; and
a controller electrically coupled to the first electrode set and the second electrode set and configured to:
select a first electrode from the first electrode set or the second electrode set;
select a second electrode from the first electrode set or the second electrode set; and
couple the first electrode and the second electrode to at least one of touch sensing circuitry or force sensing circuitry.

18. The transducer substrate of claim 17, wherein:
the piezoelectric stack actuator comprises a third electrode set; and
each electrode of the third electrode set separates at least two layers of the piezoelectric stack actuator.

19. The transducer substrate of claim 18, wherein the controller is electrically coupled to at least one electrode of the third electrode set.

20. The transducer substrate of claim 19, wherein the controller is configured to couple the at least one electrode of the third electrode set to haptic output circuitry.

* * * * *